Sept. 28, 1965  M. COZZOLI  3,208,787
HELICOPTER CARGO HOOK
Filed Dec. 15, 1961  9 Sheets-Sheet 1
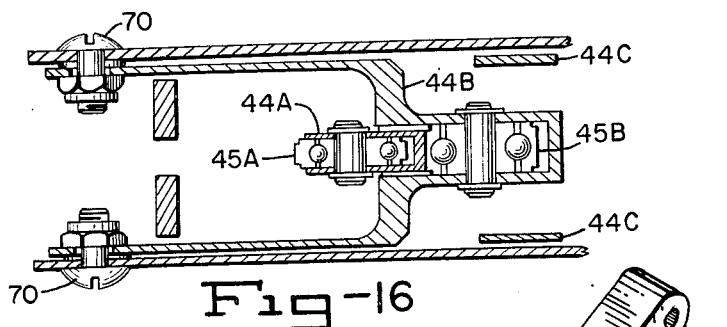
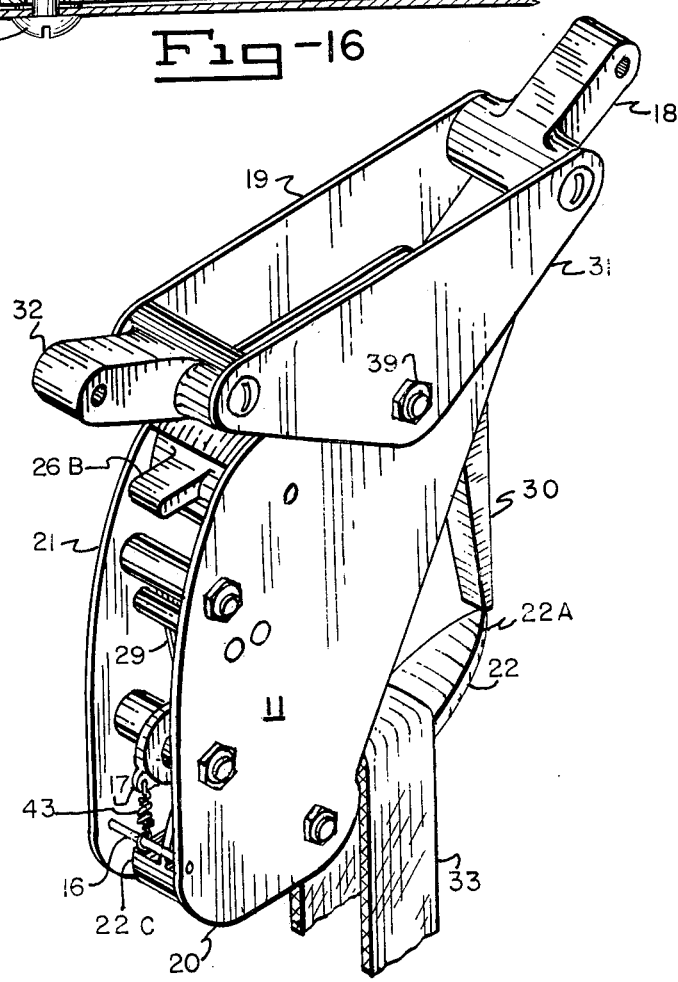
INVENTOR.
MICHAEL COZZOLI
BY
Mason, Mason & Albright
Attorneys Sept. 28, 1965  M. COZZOLI  3,208,787
HELICOPTER CARGO HOOK
Filed Dec. 15, 1961  9 Sheets-Sheet 9
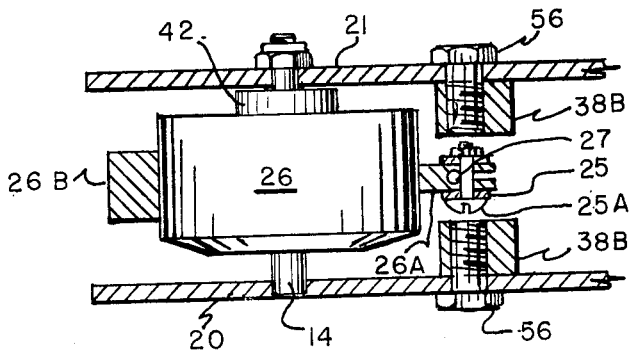
Fig-13
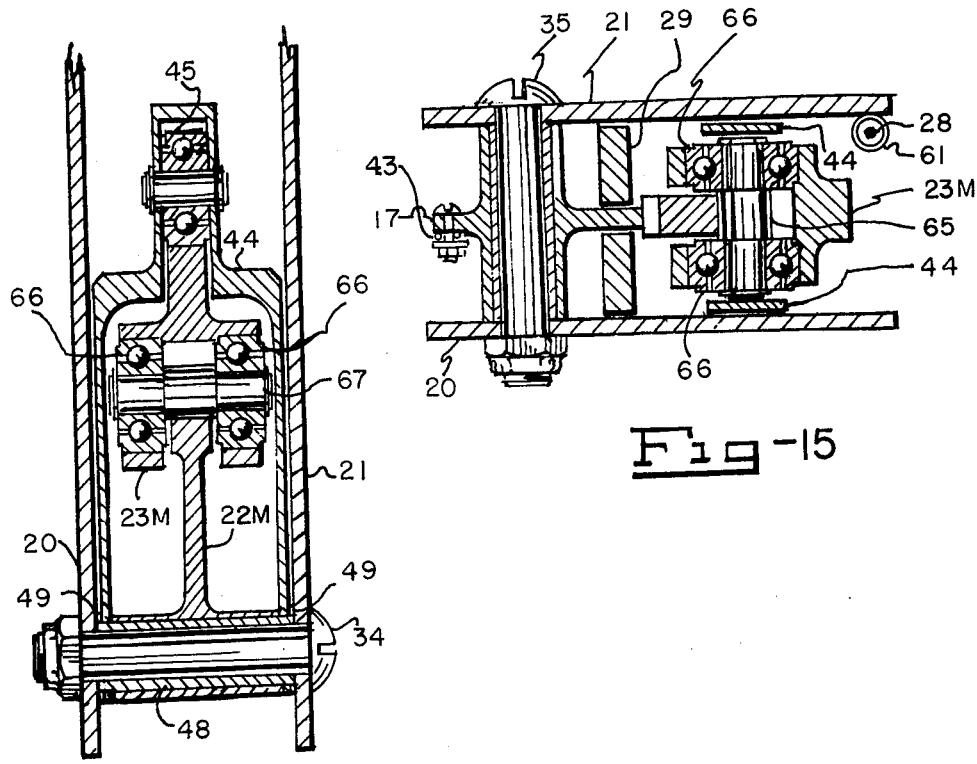
Fig-14
Fig-15
INVENTOR.
MICHAEL COZZOLI
BY
Mason, Mason & Albright
Attorneys United States Patent Office 3,208,787
Patented Sept. 28, 1965

1

3,208,787
HELICOPTER CARGO HOOK
Michael Cozzoli, 2201 Pennsylvania Ave.,
Hagerstown, Md.
Filed Dec. 15, 1961, Ser. No. 159,677
7 Claims. (Cl. 294—83)

This invention relates to a cargo hook and has particularly to do with a novel helicopter cargo hook for heavy loads which can be engaged and disengaged remotely from the helicopter without assistance from a ground crew under both load and no-load conditions.

A number of attempts have been made in the past several years by the applicant and others to design a self-engaging and remotely releasable cargo hook for helicopters of the type utilized for transporting equipment and supplies from one point to another.

The load carrying capacity of a helicopter has been and still is increasing. However, the force available to release a helicopter cargo hook remotely from within the helicopter has remained basically the same and more efficient mechanisms are desirable which will enable the crew within the aircraft to release the loads. My co-pending application, Ser. No. 131,523, filed August 15, 1961, now Patent No. 3,177,028 of which this application is a continuation-in-part, discloses a design for such a cargo hook. In such design, when the load approaches 10,000 lbs. a pull or roughly 18 lbs. is required to operate the release mechanism. With increased loads, proportionally greater effort is required. It is the object of this invention to reduce the force required for operation of the release mechanism so that with loads substantially greater than 10,000 lbs. the cargo hook can be released manually by a force of, say, less than 10 or 12 lbs.

It is a further object of this invention to provide a highly reliable remotely controlled cargo hook with a minimal number of parts which is not dependent upon close tolerances to function properly.

The invention is illustrated in the preferred embodiment in the accompanying drawings in which:

FIGURE 1 is a perspective view of the cargo hook;

FIGURE 13 is a sectional view taken on line XIII—XIII of FIGURE 2;

2

Figure 4:
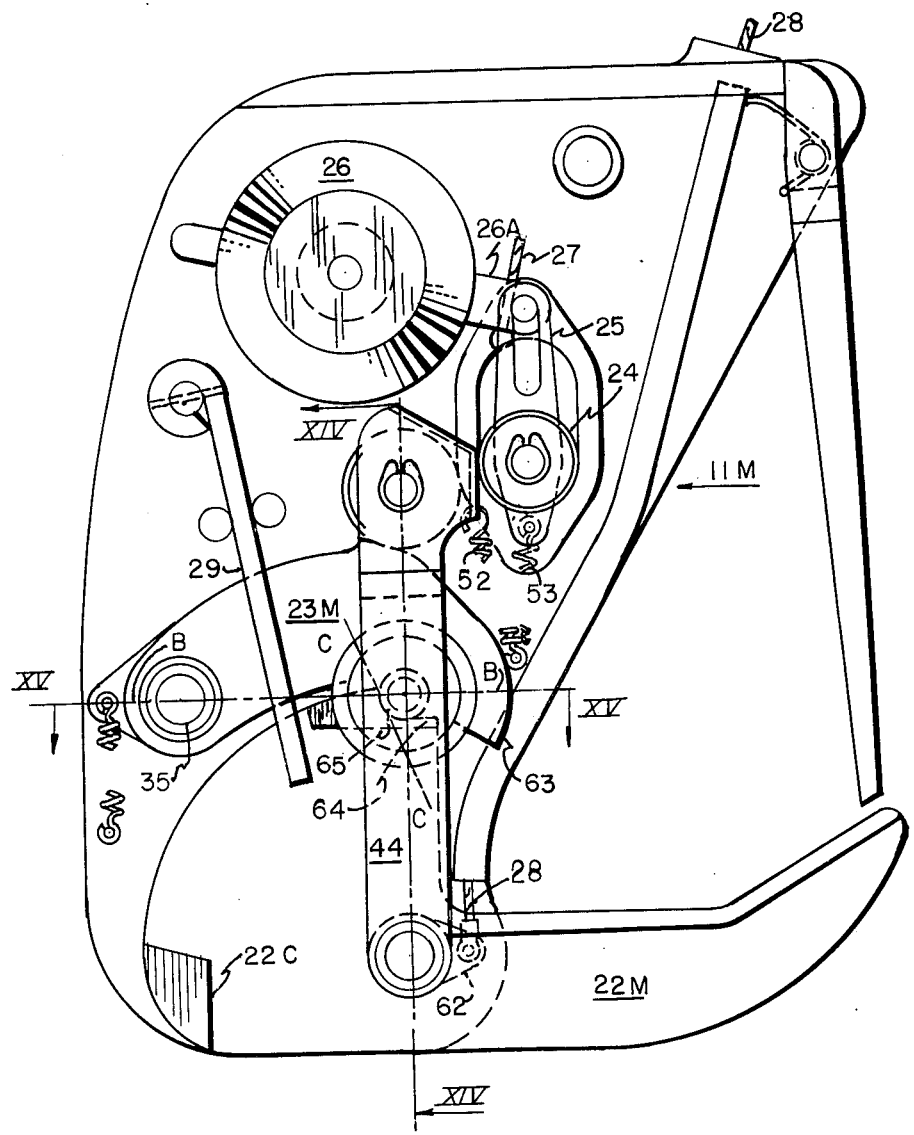
FIGURE 4 is a side view of the cargo hook with a side cover plate removed showing the mechanism in its closed position with a modified pawl and load beam construction.

FIGURE 14 is a sectional view taken on line XIV—XIV of FIGURE 4;

FIGURE 15 is a sectional view taken on line XV—XV of FIGURE 4; and

Figure 6:
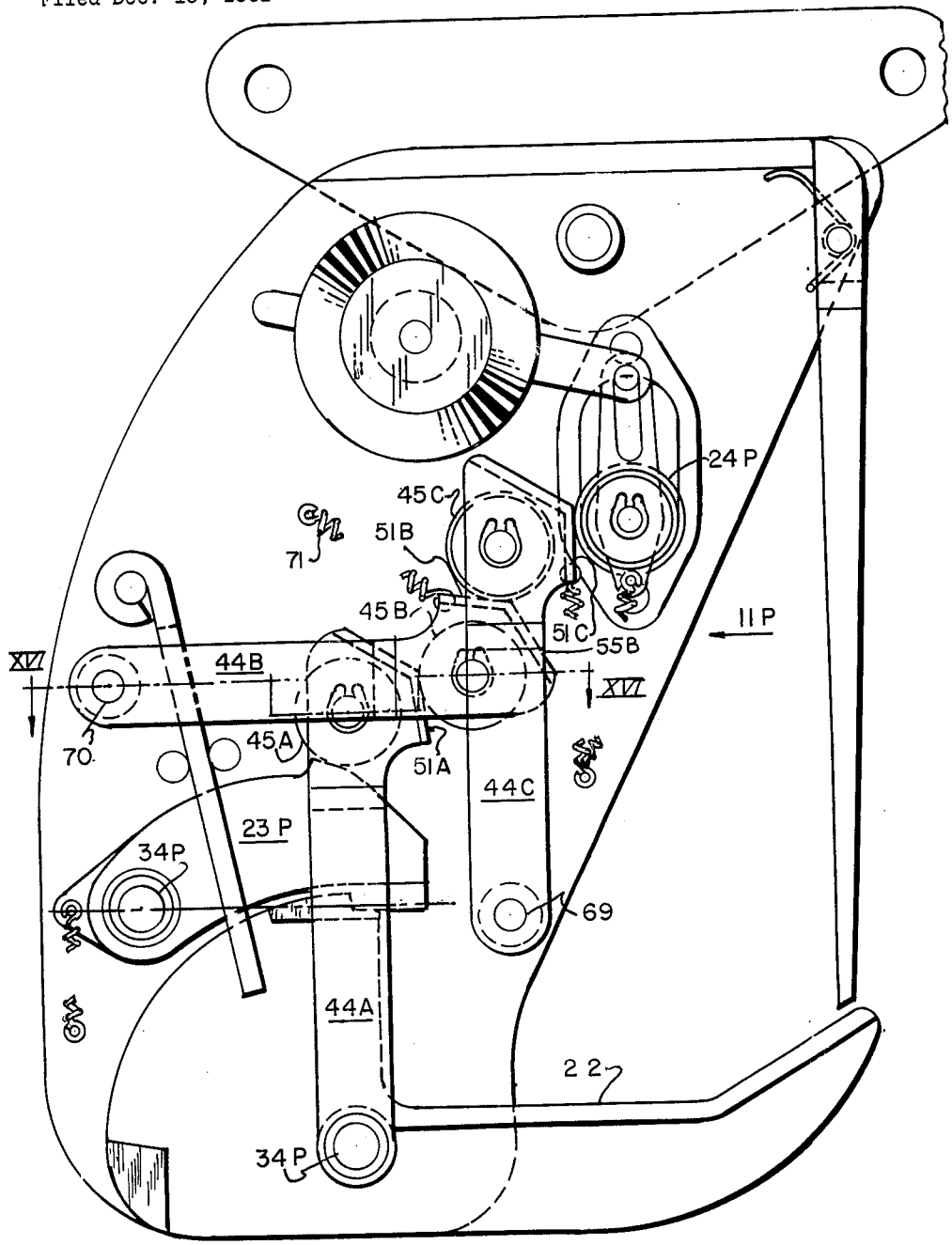
FIGURE 6 is a side view of the cargo hook with the side plate removed showing a modified arrangement of the hook's holding device.

FIGURE 16 is a sectional view taken on line XVI—XVI of FIGURE 6.

It is to be understood that although the invention described herein is for a remotely controlled cargo hook specifically designed for helicopter operation, the scope of the invention is not limited to this specific application.

Figure 2:
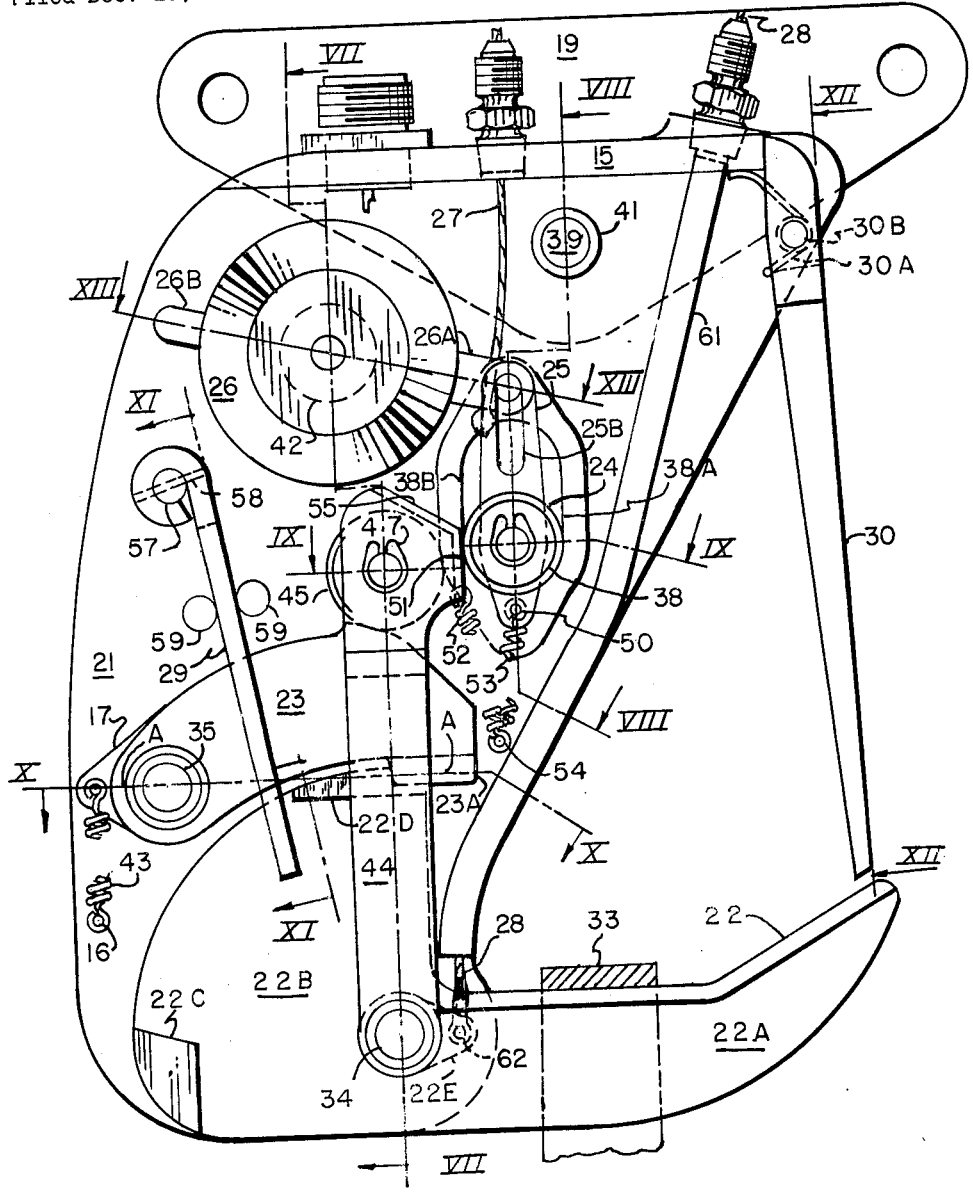
FIGURE 2 is a side view of the cargo hook with a side cover plate removed showing the mechanism in its closed position.

Referring now to FIGURES 1 and 2, the basic hook designated generally as 11 consits of two side housings or cover plates 20–21 between which are including the following components: a load beam 22 which has a forward hook portion 22A, an after catch portion 22B and projections 22C, 22D, and 22E, a top plate 15, a pawl 23, a yoke 44, a yoke roller 45, guided rollers 24, links 25, a solenoid actuator 26, a manual release cable 27, a manual reset cable 28, a bumper spring 29, and a keeper 30.

External to the housings 20 and 21 are two adapter plates 19 and 31 which provide support for the hook 11 and are joined by means of bolt 39. Bushing 41 (see FIGURE 8) is provided to permit improved rotation of hook 11 about the pivot bolt 39. Connected to the adapter plates 19 and 31 in the upper aspect are two shackle adapters 18 and 32. It is to be understood that in operation the shackle adapters 18 and 32 will be engaged by shackles which in turn are engaged by cables or the like depending from the helicopter.

The load which is to be carried is applied to the load beam 22 through an adapter sling 33. The weight of the load is carried by the load beam pivot bolt 34 which is mounted between the housings 20 and 21. The downward force on the adapted sling 33 causes a clockwise moment in a load beam 22 which reacts in its catch portion 22B against the offset portion 23A of pawl 23. Thus the load on the adapter sling 33 reacts horizontally against the pawl 23 and consequently, against the pawl pivot bolt 35 which is mounted between the housings 20 and 21. Where the load beam catch portion 22B engages the offset portion 23A, a tough, hard, surface such as Stellite is preferable.

Figure 3:
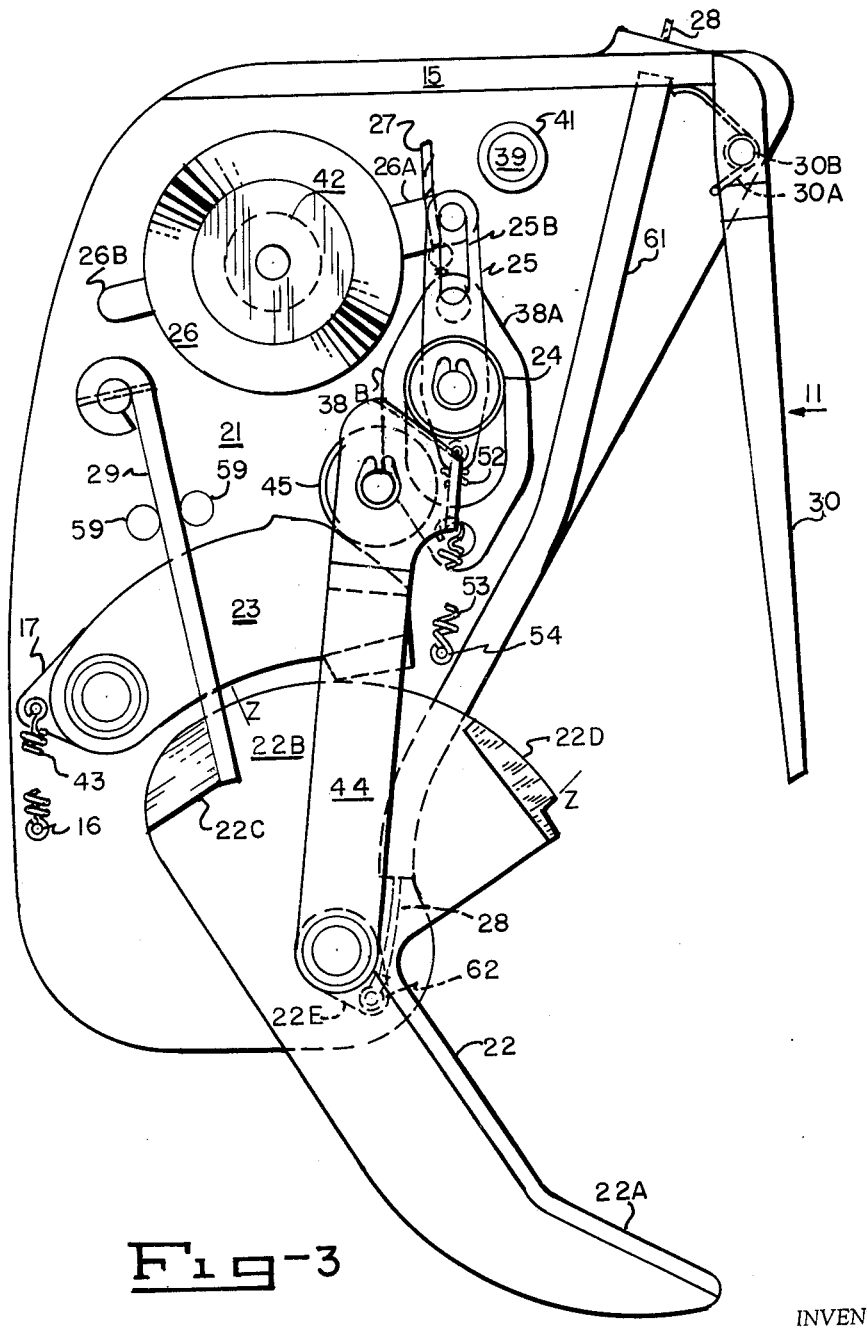
FIGURES 3 is a side view of the cargo hook similar to FIGURE 2 showing the mechanism in its opened position.
Figure 7:
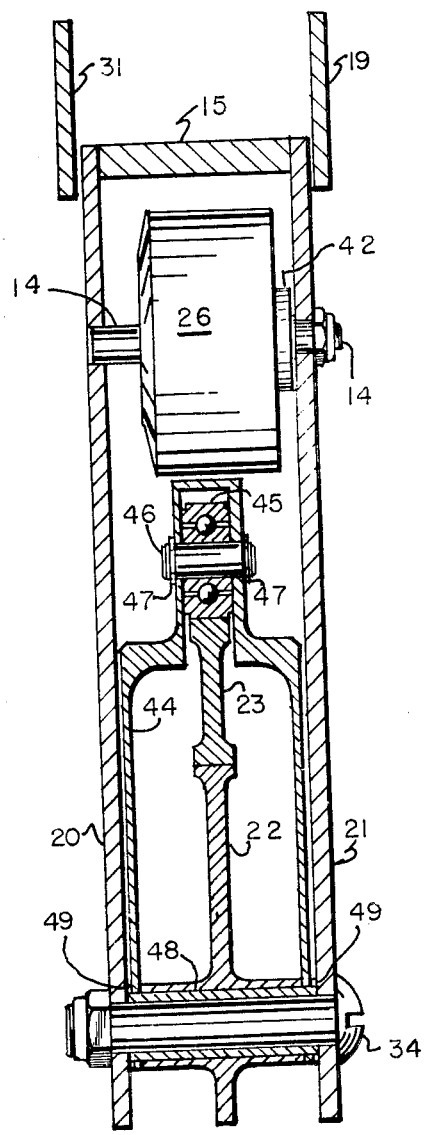
FIGURE 7 is a sectional view taken on line VII—VII of FIGURE 2.

As can best be seen in FIGURE 1 a spring 43 connects a pin 16 mounted between the housings 20 and 21 and a projection 17 from the after part of the pawl 23. This spring 43 is in tension and tends to move the pawl 23 in a counterclockwise direction as seen from FIGURE 2. A centerline, such as A—A, projecting from the pawl pivot bolt 35 and intersecting the line formed by the interengaging surfaces of the offset portion 23A of pawl 23 and catch portion 22B of the load beam 22 forms therewith an obtuse angle which opens towards the greater portion of catch portion 22B of the load beam 22. With such construction, the torque resulting from the load on sling 33 tends to cause the pawl 23 to raise and thus disengage the catch portion 22B of the load beam 22. It is thus to be noted that there are two forces which are urging the pawl 23 to move counterclockwise and disengage the load beam 22. These forces result from the action of spring 43 and the upward component of force from the load due to the position of the pawl pivot bolt 35 in relation to the catch surface of the offset portion 23A. These forces are, however, countered by the yoke roller 45 which bears on the top of the pawl 23. The yoke roller 45 is carried in a yoke 44 which pivots about the load beam pivot bolt 34. Referring to FIGURE 7, it will be noted that the yoke roller 45 is mounted within the yoke 44 by means of a pin 46 which is held in place by snap rings 47. To minimize friction, the yoke roller 45 constitutes a ball bearing. A bushing 48 surrounds the load beam pivot bolt 34 and also acts as a spacer. The yoke 44 is maintained in a spaced relationship from the sides 20 and 21 by means of spacer washers 49. Washers 49 together with yoke 44 tend to center the load beam 22 between the housings 20 and 21. It is to be noted that the pawl, where it meets the roller 45, is inclined with respect to the horizontal, or more specifically, it is inclined with respect to an imaginary plane which is perpendicular to a vertical center line intersecting the axes of the yoke pin 46 and the load beam pivot bolt 34. It is hence apparent that components of upward force from the pawl 23 are divided between the vertical and horizontal depending upon the degree of inclination of the upper part of the pawl 23 where it meets the roller 45. The less this inclination is from the horizontal, the greater will be the vertical component of force as compared with the horizontal component of force. The horizontal component of force is countered by the locking effect of the guided rollers 24 where they meet the yoke's bearing surface 51. It is to be noted that the planes comprising the yoke's bearing surface 51 and the guides 38A are parallel and that these planes are perpendicular to the horizontal center line of the yoke roller 45 which intersects the plane where rollers 24 bear on surface 51. Since this is the case, there is no tendency for the horizontal component of force of the yoke 44 against the rollers 24 to cause the rollers 24 to move to the released position shown in FIGURE 3. Moreover, a spring 53, which is in tension between a pin 50 joining the roller links 25 and a pin 54 mounted between the housings 20 and 21, tends to urge the rollers 24 into their lower locking position as shown in FIGURE 2. A further yoke spring 52 connects the pin 54 and the yoke 44 near the yoke's bearing surface 51. This spring is in tension and adds slightly to the horizontal component of force of yoke 44 in a clockwise direction as seen in FIGURE 2. It will be appreciated that spring 52 will urge the yoke 44 into the position shown in FIGURE 3 when the rollers are in their raised position irrespective of the components of force from pawl 23 against the yoke roller 45. The yoke 44 has an upper inclined surface 55. When the rollers 24 are in their upper position as shown in FIGURE 3 they bear upon this inclined surface 55 and due to the action of spring 53 exert a counterclockwise moment of force on yoke 44 as seen in FIGURE 3. Since this moment in force is greater than that exerted by spring 52 in the opposite direction, when pawl 23 no longer blocks the way yoke 44 is thereby returned to the position shown in FIGURE 2.

Figure 8:
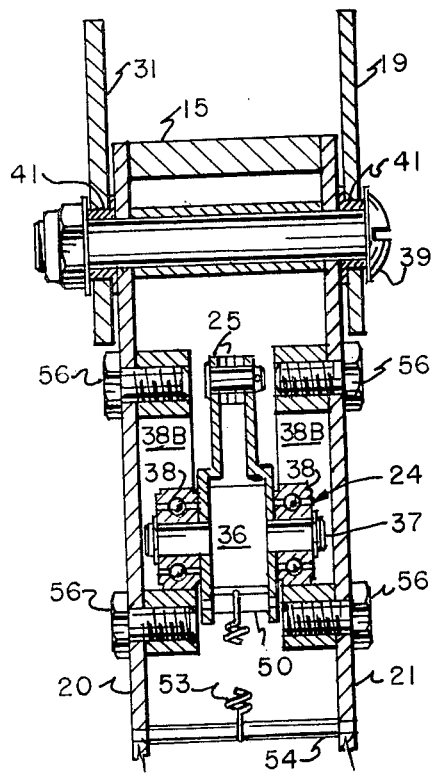
FIGURE 8 is a sectional view taken on line VIII—VIII of FIGURE 2.
Figure 9:
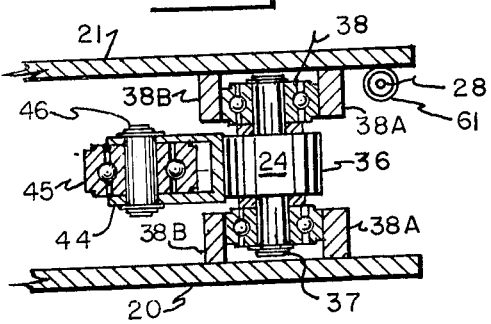
FIGURE 9 is a sectional view taken on line IX—IX of FIGURE 2.
Figure 10:
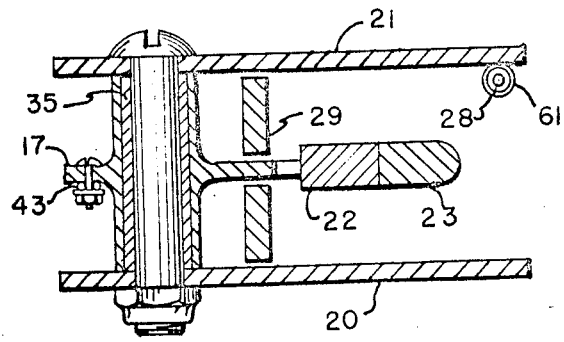
FIGURE 10 is a sectional view taken on line X—X of FIGURE 2.
Figure 12:
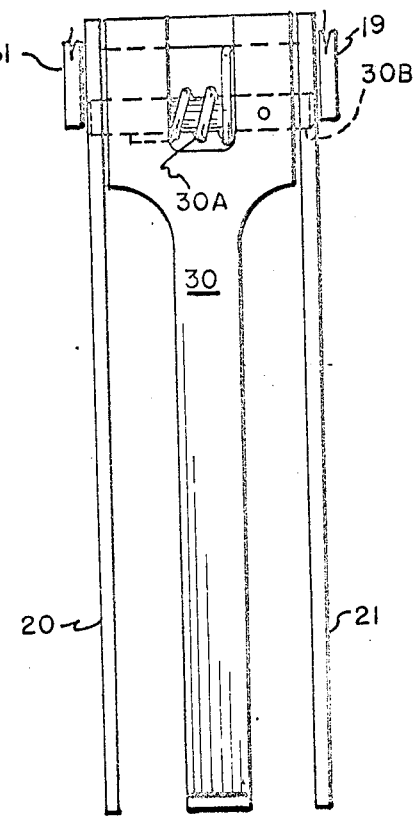
FIGURE 12 is a sectional view taken on line XII—XII of FIGURE 2.

Looking at FIGURE 8, it will be seen that the rollers 24 comprise a center roller 36 which is a part of the shaft 37, and two outer rollers 38 which are ball bearings and are carried together on the shaft 37. The force from the yoke's bearing surface 51 is borne by the center roller 36 which, by means of the shaft 37, transmits the force to the outer rollers 38. The outer rollers 38 are held in place by the forward guides 38A and the after guides 38B, a set of each being incorporated into one piece and secured to the housings 20 and 21 by means of studs 56. As previously pointed out, since the guides 38A and 38B are parallel to the yoke's bearing surface 51, there is no tendency for the rollers to be moved upwardly due to the clockwise force from yoke 44 as viewed from FIGURE 2.

Figure 11:
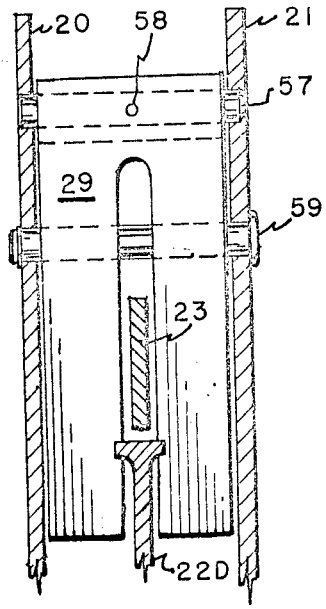
FIGURE 11 is a sectional view taken on line XI—XI of FIGURE 2.

Release of the load is accomplished by pulling on the manual release cable 27 or by energizing the actuator 26 which causes the roller links 25 to move the rollers 24 vertically from the position shown in FIGURE 2 to the position shown in FIGURE 3. When the rollers 24 are brought to the released position shown in FIGURE 3, the yoke 44 is free to move in a clockwise position about the load beam pivot bolt 34 and upon doing so, the pawl 23 is no longer held down and rotates counterclockwise about the pawl pin 35 due to the upward component of force from the load beam 22 and force exerted by spring 43 until it is free of the catch portion 22B of the load beam 22. When this occurs, the load beam 22 is released to rotate in a clockwise direction about the load beam pivot bolt 34 to the position shown in FIGURE 3. With the load beam 22 in this position, the adapter sling 33 slides off thereby freeing the load from the hook. It is not, however, necessary to have a load on the hook for this to occur since the weight of the hook portion 22A is sufficient to cause the pawl 23 to be disengaged. A bumper spring 29 is secured within hook 11 to housings 20 and 21 by bumper pin 57, mounted between the housings 20 and 21, and a securing pin 58 which secures the bumper spring 29 to the bumper pin 57. As seen in FIGURE 2, the bumper spring 29 embraces the bumper pin 57 in its upper aspect and is braced by two further pins 59 which are mounted between the housings 20 and 21 (see FIGURE 11). When the load beam 22 is released under full load conditions, the bumper spring 29 is engaged by projections 22C extending from each side of load beam 22 and in doing so absorbs the kinetic energy from the load beam 22. Further projections 22D extend outwardly from both sides of the load beam 22 in the catch portion 22B. The purpose of these is to restrict the counterclockwise movement of the load beam 22 when it is closed.

A hook is held in its released configuration as shown in FIGURE 3 by the cam surface Z—Z in the catch portion 22B of the load beam 22. To reset the hook from its released position, it is only necessary to pull on the manual reset cable 28 until the load beam 22 is brought into the position shown in FIGURE 2. It will be noted that cable 28 is guided within a tube 61 to a securing means 62 which connects the cable 28 to a projection 22E from load beam 22. When load beam 22 is returned to the position shown in FIGURE 2, the spring 53 returns the rollers 24 to the position shown in FIGURE 2 which at the same time moves the yoke 44 in a counterclockwise direction while the pawl 23 moves into the locked position shown in FIGURE 2.

The angle between the transverse center line A—A and the meeting of the catch portion 22B and the offset portion 23A is of such magnitude that the clockwise moment created by the weight of the load beam is just slightly greater than the angle of friction so that the pawl 23 is thereby moved upwardly. Thus, when rollers 24 are raised and yoke 44 out of the way, the load beam 22 will open due to its own weight. The force of the yoke's bearing surface 51 against the rollers 24 is a function of the upward force on the pawl due to the weight carried by the load beam 22 and the inclination of the upper portion of the pawl 23 against the yoke roller 25 from the horizontal. This inclination can be varied to suit the desired capacity of the hook 11 and the desired force to pull the rollers 24 into a raised position.

The keeper 30, which is pivoted from the hook 11 by a pin 30B held between the housings 20 and 21, is arranged so that it is normally held outward as shown in FIGURE 2 by the urging of a spring 30A but may be deflected inwardly on contact with adapter spring 33 during an engagement. When the load beam 22 is in closed position, sling 33 cannot be disengaged.

The solenoid 26 is mounted on a shaft 14 which is secured in a fixed relation with the housings 20 and 21. When energized, the solenoid itself rotates in a counterclockwise direction as seen from FIGURE 2. It is returned by means of a spring 42. A projection 26A from solenoid 26 connects to links 25 by a nut and bolt connection 25A (See FIGURE 13). Projection 26A is bifurcated and cable 27 is secured thereto in the dividing space inward of connection 25A. The slot 25B is elongated to allow the connection 25 to move when solenoid 26 is no longer energized and the hook remains open. The projection 26B constitutes a manual control for ground testing.

Prior to a helicopter pickup, a load is prepared on the ground in such a way as to have a semi-flexible angular sling adapter 33 anchored on top of load which stands vertically. A helicopter descends into the vicinity of the load and the pilot, guided by a crew member to whom the hook 11 and the load are visible, maneuvers the hook 11 to engage the load. The load is applied to the load beam 22 to the adapter spring 33. The helicopter then rises and carries the load suspended from hook 11. As the adapter plates 19 and 33 are relatively fixed, the cargo hook 11 is free to rotate or swing fore and aft about the spacer bushing 41. This single point suspension permits the cargo hook to align itself to any attitude the load may take both from dragging forward or rearward on the ground, or in maneuvering during flight.

On reaching its destination, the helicopter descends until the load touches the ground at which time the pilot or crew member releases the hook 11 by either manually pulling the cable 27 or by the electrical means at his disposal. After the release, the load beam 22 may be reset by pulling on cable 28.

Figure 5:
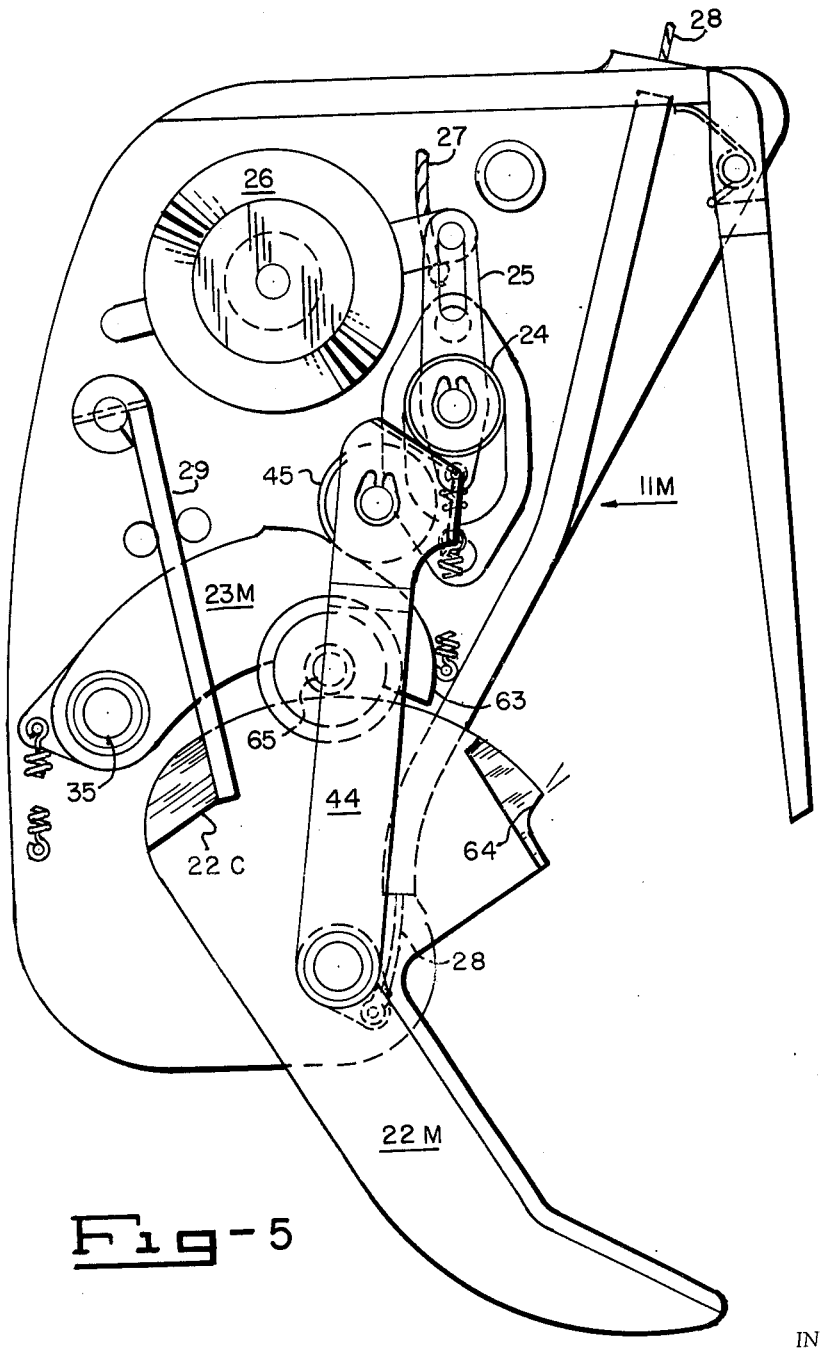
FIGURE 5 is a side view of the same cargo hook shown in FIGURE 4, but in an opened position.

FIGURES 4 and 5 show a hook 11M which is identical with the hooks shown in FIGURES 1–3 except that the pawl 23M has a modified offset portion 63 and the load beam 22M has a modified catch portion 64. Instead of a frictional contact, a roller 65 is provided which fits into the curved recess of catch portion 64. As can be seen in FIGURES 14 and 15, the modified pawl 23M carries two ball bearings 66 which are carried by a roller shaft 67 the roller 65 being a central enlarged circumferential area of the roller shaft 67. It is to be noted that any centerline B–B projected from the pawl pivot bolt 35 and intersecting a tangent C—C to roller 65 where the latter engages the catch portion 64 of load beam 22M forms with tangent C—C an obtuse angle which opens towards the greater part of the after portion of load beam 22M containing projection 22C.

FIGURE 5 shows the modified embodiment of FIGURE 4 in an opened position. The operation of this embodiment corresponds to the operation heretofore disclosed for hook 11. In brief, the manual release cable 27 is pulled upward or solenoid actuation 26 is energized to raise rollers 24 through the linkage comprising links 25 and projection 26A. When the rollers 24 are in their upward position as shown in FIGURE 5, the yoke 44 moves clockwise and the clockwise moment of load beam 22M causes the pawl 23M to move upward whereby load beam 22M is free to rotate clockwise until stopped by projection 22C meeting bumper 29. To reset hook 11A in its closed position as shown in FIGURE 4, the manual reset cable 28 is pulled upward to pull the load beam 22 back into the position shown in FIGURE 4. When this occurs, the weight of the pawl 23M and the downward components of force transferred to pawl 23M from rollers 24 and spring 53 via yoke 44 combine to reset the offset portion 63 of pawl 23M into catch portion. With the rollers returned to the position shown in FIGURE 4, the mechanism is locked in closed position until affirmative action is taken to effect the release. With this modification, the friction between catch portion 64 and offset portion 63 is practically nil to permit a somewhat easier release under no-load conditions.

It is to be noted in this embodiment, as well as in the embodiment disclosed in FIGURES 2 and 3, that when the hook is closed, the spring 52 is at its greatest tension and spring 53 is at its minimum tension, as each are structurally attached. When the hook is in opened position, the reverse is true. This circumstance serves to enhance positive action of the hook both to open and to secure in closed position.

FIGURE 6 shows a hook 11P similar to that disclosed in FIGURES 1–3 except that a plurality of yoke structures 44A, 44B and 44C have been inserted instead of the single yoke as shown in FIGURES 2 and 3. However, it will also be noted that the surfaces 51A and 51B have a different inclination than the yoke's bearing surface 51 in FIGURES 2 and 3 and also the yoke's bearing surface 51C in FIGURE 6. A pivot bolt 69, which is mounted between the housings 20 and 21, is provided for the yoke 44C. A further pivot bolt 70, which is similarly mounted, is provided for the yoke 44B. It is thus to be noted that the upward component of force from the pawl 23P on the rollers 45A of yoke 44A is divided between horizontal and vertical components as previously described in reference to FIGURES 2 and 3. The vertical component is largely absorbed by the pivot bolt 34P whereas the horizontal component with a small portion of the vertical component of force is transmitted to the next roller 45B. Since the surface 51A is inclined with respect to the vertical, the component of force from yoke 44A to roller 45B is again divided into further horizontal and vertical components in respect to the yoke 44B. The horizontal component is largely absorbed by the pivot bolt 70 and the vertical upward force together with a small horizontal component of force is received by the roller 45C of the yoke 44C. Here again the forces are again divided and the smaller horizontal residual force will bear against the rollers 24P whereas the larger residual vertical component will be taken up by the pivot bolt 69. This type of arrangement is useful for hooks with very large load capacities, and also where it is desired to maintain the force to release the hook within narrow limits.

It will be appreciated that the embodiment of FIGURE 6 is released and secured in the same manner as the hooks in the previous embodiment. Any number of intervening yoke-roller devices, such as constitute yoke 44B, pivot bolt 70, roller 45B and surfaces 51B and 55B, may be included to increase the mechanical advantage, as desired. In order that the mechanical advantage will not work to prevent effective resetting of the mechanism, springs, such as spring 71 are employed to act against component of force due to the weight of the yoke-roller devices. As will be noted from FIGURE 16, the roller 45A is smaller in its thickness than the roller 45B—the size of the rollers and the yokes and the inclination of the bearing surfaces being the choice of one working in the art to arrive at the most effective structural proportions in view of the characteristics desired of the hook.

It is to be appreciated in the various embodiments that although a rotary solenoid 26 is shown, any other type of electric, hydraulic, or pneumatic actuator may be employed to move the mechanism to its released position.

The above description and drawings disclose several embodiments of the invention and specific language has been employed in describing the several figures. It will, nevertheless be understood that no limitation of the scope of the invention is thereby contemplated, and that various alterations and modifications may be made such as would occur to one skilled in the art to which the invention relates.

I claim:

1. A cargo hook comprising a housing, a load beam pivot secured within said housing, a load beam pivoted on said pivot, said load beam including a hook portion extending forwardly from said pivot out of said housing and an after catch portion extending rearwardly from said pivot, a pawl which includes an offset portion removably engaging said catch portion, a pawl pivot bolt mounted in said housing, said pawl pivot bolt carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, movable yoke means bearing against said pawl and maintaining same in engagement with said catch portion of said load beam, said yoke means being pivotably connected to said beam pivot, holding means removably holding said yoke means against said pawl, and actuation means for removing said holding means from said yoke means, whereby said yoke means is urged to pivot forwardly and ceases holding said pawl in engagement with said catch portion of said load beam and the weight of said hook portion of said load beam causes said catch portion to disengage said offset portion of said pawl and said hook opens.

2. The invention of claim 1 wherein the yoke means straddles said pawl and said yoke means is provided with a roller which bears against said pawl.

3. The invention of claim 1 wherein the offset portion of the pawl includes a roller which bears on said catch portion.

4. The invention of claim 1 wherein the actuation means includes an accessible manual release projection for removing said holding means from said yoke means.

5. The invention of claim 1 wherein the holding means is comprised of a plurality of pivoted yokes, said yokes abutting one another.

6. The invention of claim 1 wherein a first resilient means is attached to said yoke means to urge same from said pawl and a second resilient means is attached to said holding means to urge same against said yoke means.

7. The invention of claim 6 wherein the first resilient means is in maximum tension and said second resilient means is in minimum tension when said hook is closed and said first resilient means is in minimum tension and said second resilient means in maximum tension when said hook is open.

References Cited by the Examiner

UNITED STATES PATENTS

| 905,576 | 12/08 | Porter | 294—83 |
|---|---|---|---|
| 2,789,468 | 4/57 | Burns | 294—83 X |
| 2,868,581 | 1/59 | Minty. | |

FOREIGN PATENTS 10,861  1915  Great Britain.

GERALD M. FORLENZA, *Primary Examiner.*

LEO QUACKENBUSH, ANDRES H. NIELSEN, WILLIAM B. LA BORDE, *Examiners.*